(No Model.)
F. WOHLGEMUTH.
THEATRICAL APPLIANCE.
No. 475,226.  Patented May 17, 1892.
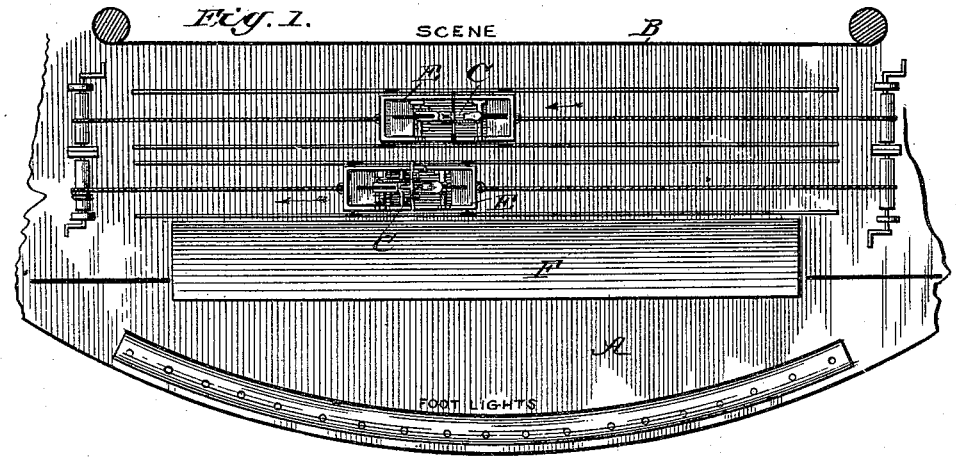
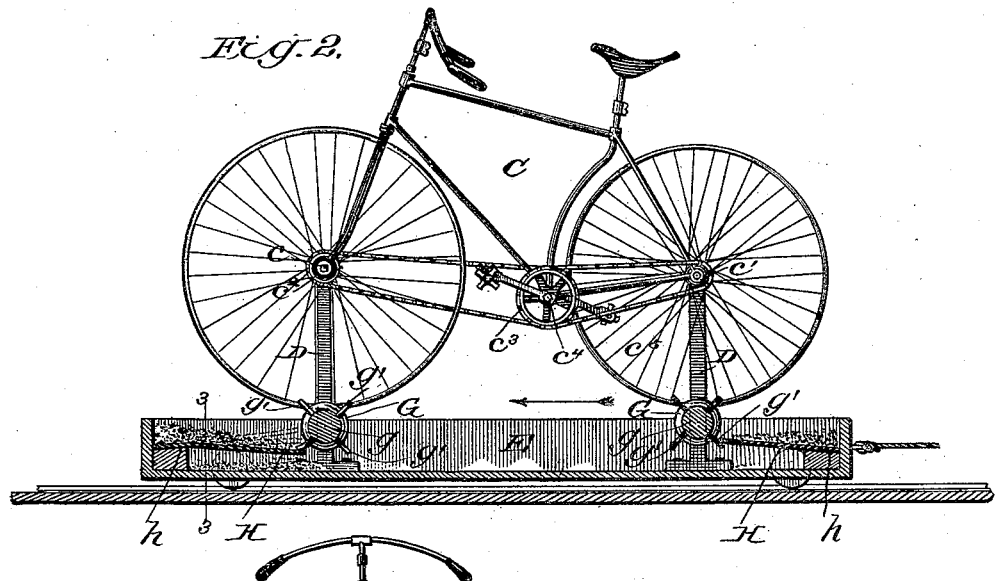
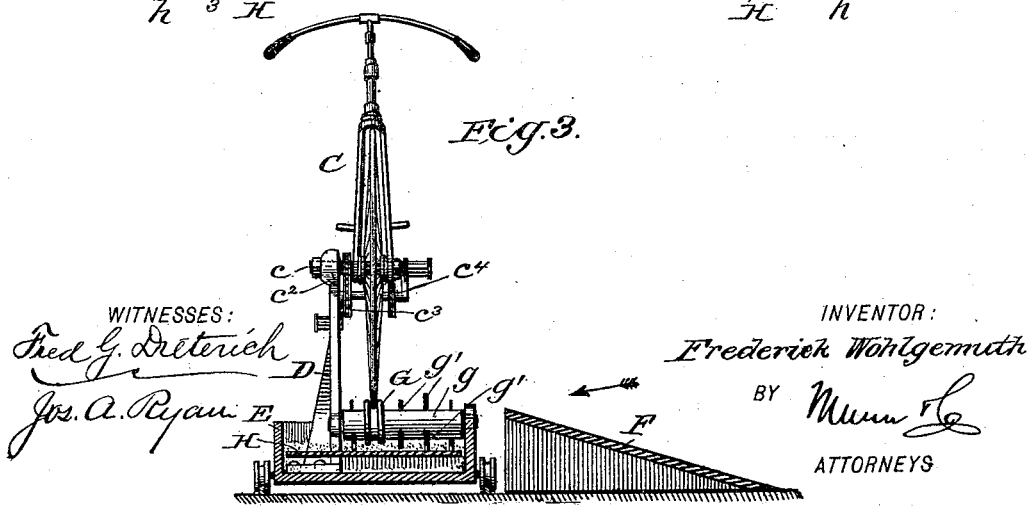
WITNESSES:
Fred G. Dieterich
Jos. A. Ryan
INVENTOR:
Frederick Wohlgemuth
BY Munn & Co.
ATTORNEYS

UNITED STATES PATENT OFFICE.

FREDERICK WOHLGEMUTH, OF PHILADELPHIA, PENNSYLVANIA.

THEATRICAL APPLIANCE.

SPECIFICATION forming part of Letters Patent No. 475,226, dated May 17, 1892.

Application filed November 9, 1891. Serial No. 411,402. (No model.)

*To all whom it may concern:*

Be it known that I, FREDERICK WOHLGEMUTH, residing at Philadelphia, in the county of Philadelphia and State of Pennsylvania, have invented certain new and useful Improvements in Theatrical Appliances, of which the following is a specification.

My invention has for its object to provide a device used for the purpose of aiding in producing the illusary effect of a race on a stage; and it relates more particularly to an apparatus by means of which the effect of a bicycle race may be produced.

My invention consists in a bicycle capable of being mounted to have its wheels free from contact with the surface on which it appears to run, its front and rear wheels geared together, and its pedals held free to be operated by the rider, the supports of the machine being secured to and projected up from a carriage adapted to be moved over the stage, which carriage carries suitably-arranged dust-making devices operated by the motion of the bicycle-wheels, whereby the illusary effect of the race is rendered the more effective.

It also consists in the peculiar combination and novel arrangement of parts, all of which will hereinafter be fully described in this specification and then pointed out in the claims, reference being had to the accompanying drawings, in which—

Figure 1 is a plan view of a stage and the race apparatus. Fig. 2 is a sectional elevation of the stage-floor, the carriage, and the bicycle mounted thereon; and Fig. 3 is a transverse vertical section taken on the line 3 3, Fig. 2.

Referring to the accompanying drawings, A denotes the stage; B, the background or scene arranged immediately back of the racing apparatus and consisting, usually and preferably, of a panorama mounted and operated in any well-known manner.

C indicates the bicycle, which is preferably a "Safety," the axles $c\ c'$ of the front and rear wheels of which are formed with extensions held in the upper ends of the standards D D, projected up to the rear side of the machine, the lower ends of which are secured to the base of the carriage E, which is arranged to be moved along on the stage-floor. The carriages E are arranged to be drawn across the stage upon suitable guide-rails, any well-known means for moving them being employed—such as, for instance, the rope-and-windlass mechanism shown in Fig. 1. In all cases, however, it is intended that the carriages be moved on the stage-floor proper, and to avoid the necessity of forming channel-ways or grooves, and yet readily conceal them from view, an inclined floor-section F is provided, which in practice may be of such a gradual rise that its presence will not be noticed by the audience.

It will be noticed by reference to Fig. 2 that the front axle is formed with a sprocket-wheel $c^2$, which is geared with a sprocket-wheel $c^3$, secured to the pedal-shaft $c^4$, which also carries the usual drive-wheel $c^5$, as shown. This construction provides an effective means for positively operating the front wheel to a speed similar to that of the rear wheel. Each of the wheels have a frictional contact with grooved collars G G, mounted on shafts $g\ g$, journaled, as shown, which shafts have radial fingers $g'$, formed of any suitable flexible material, which as the shafts $g\ g$ are revolved engage flaps H H, formed of rubber or other flexible material, secured at one end $h$ to the carriage, while their forward ends are free to be engaged by the fingers $g'$, as stated.

In practice a quantity of dust-producing material is placed on the flaps and in the carriages. It will be therefore readily understood that when the wheels of the machine are in motion the flaps will be constantly engaged by the fingers $g'$, and dust created thereby giving the same race effect as if the machines were in actual use along a highway or dirt road, and by having a number of carriages the movements thereof may be alternated in such a manner as to allow such a change of positions as may be desired.

Having thus described my invention, what I claim, and desire to secure by Letters Patent, is—

1. The combination, with the stage and the movable carriage provided with standards D D, as shown, of a bicycle of the kind shown, having its axles journaled and supported in the said standards, its front axle being geared to the pedal-shaft, all arranged substantially as shown, and for the purpose described.

2. In combination with a stage, a movable carriage, a bicycle operatively held therein, and dust-producing devices carried by the carriage, arranged to be operated when the bicycle-wheels are revolved, substantially as and for the purpose described.

3. The combination, with the stage, the movable carriage, the bicycle mounted thereon for independent movement, of the shafts mounted in the carriage under the bicycle-wheels and held for frictional contact therewith, such shafts having radial fingers, and flexible dust-making flaps adapted to be engaged by said fingers, all arranged substantially in the manner and for the purpose described.

FREDERICK WOHLGEMUTH.

Witnesses:
    FRED G. DIETERICH,
    SOLON C. KEMON.